United States Patent [19]

Yoshida

[11] Patent Number: 5,109,818
[45] Date of Patent: May 5, 1992

[54] ENGINE SPEED LIMITING APPARATUS

[75] Inventor: Toshiyasu Yoshida, Shizuoka, Japan

[73] Assignee: JATCTO Corporation, Japan

[21] Appl. No.: 718,643

[22] Filed: Jun. 21, 1991

[51] Int. Cl.$^5$ ............................................. F02D 39/02
[52] U.S. Cl. ..................................... 123/319; 123/350
[58] Field of Search ............... 123/319, 335, 350, 351, 123/334, 416, 380; 74/859, 860; 364/431.03

[56] References Cited

U.S. PATENT DOCUMENTS

| 4,200,007 | 4/1980 | Espenschied et al. | 74/859 |
| 4,443,852 | 4/1984 | Kobayashi et al. | 360/431.03 |
| 4,459,954 | 7/1984 | Slavik et al. | 123/350 |
| 4,472,777 | 9/1984 | Youngblood | 123/351 |
| 4,573,440 | 3/1986 | Pischke et al. | 123/350 |
| 4,597,465 | 7/1986 | Burney | 123/351 |

FOREIGN PATENT DOCUMENTS

| 59-168724 | 9/1984 | Japan | 123/335 |
| 59-231173 | 12/1984 | Japan | 123/335 |
| 60-4433 | 1/1985 | Japan | 123/319 |
| 60-135632 | 7/1985 | Japan | 123/319 |

Primary Examiner—Raymond A. Nelli
Attorney, Agent, or Firm—Ronald P. Kananen

[57] ABSTRACT

An apparatus for use with an automotive vehicle including an internal combustion engine and an automatic transmission operable in a selected one of positions including "park", "neutral" and "drive" positions. A control signal is produced to limit the speed of the engine below a predetermined value when the transmission is in the "neutral" position. The control signal is interrupted when the transmission is in the "park" position.

3 Claims, 3 Drawing Sheets

ENGINE SPEED LIMITING APPARATUS

BACKGROUND OF THE INVENTION

This invention relates to an apparatus for use with an automotive vehicle having an internal combustion engine and an automatic transmission to limit the engine speed below a predetermined value when the automatic transmission is in a specified position.

For example, Japanese Patent Kokai No. 60-4433 discloses a conventional engine speed limiting apparatus arranged to avoid a sudden vehicle starting by preventing transmission of a drive from the engine to the automatic transmission until the automatic transmission is changed from the "park" position to the "drive position" when the vehicle is at rest with the accelerator pedal being depressed. However, such a conventional apparatus permits the engine speed to increase to a great extent causing engine racing noises when the automatic transmission is in the "neutral position".

Another conventional engine speed limiting apparatus is disclosed in Japanese Patent Kokai No. 60-135632. The conventional apparatus is arranged to avoid a sudden vehicle starting by rapid throttle valve closure in response to a change to the "drive" position when the engine idling speed is high. With such a conventional apparatus, however, a long time is required to decrease the engine speed so as to provide an undesirable feed of starting lag to the operator when the automatic transmission is changed from the "neutral" position to the "drive" position while the engine speed is increasing.

SUMMARY OF THE INVENTION

Therefore, a main object of the invention is to provide an improved engine speed limiting apparatus which can avoid a sudden vehicle starting without providing an undesirable feed of starting lag when the automatic transmission is changed from the "neutral" position to the "drive" position.

It is another object of the invention to provide an improved engine speed limiting apparatus which can reduce the impact torque applied to the power train of the automatic transmission when the automatic transmission is changed from the "neutral" position to the "drive" position.

It is another object of the invention to provide an improved engine speed limiting apparatus which can ensure engine racing when the automatic transmission in the "park" position.

It is still another object of the invention to provide an improved engine speed limiting apparatus which can ensure a smooth vehicle starting without shock.

There is provided, in accordance with the invention, an apparatus for use with an automotive vehicle including an internal combustion engine operable at variable speeds and an automatic transmission operable in a selected one of positions including "park", "neutral" and "drive" positions. The apparatus comprises first means for detecting the selected position of the transmission, second means for producing a control signal when the transmission is in the "neutral" position and for interrupting the control signal when the transmission is in the "park" position, and third means responsive to the control signal for limiting the speed of the engine below a predetermined value.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
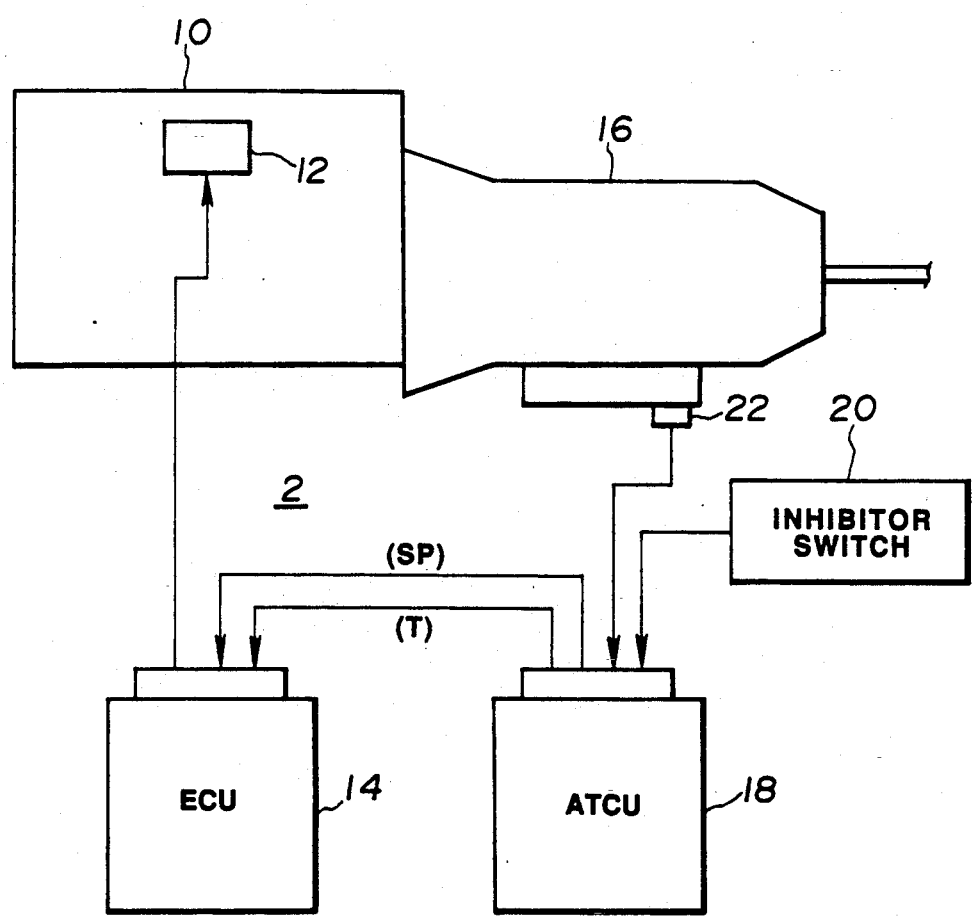
FIG. 1 is a schematic diagram showing one embodiment of an engine speed limiting apparatus made in accordance with the invention.

With reference to the drawings, and in particular to FIG. 1, there is shown an engine speed control apparatus embodying the invention. An internal combustion engine, generally designated by the numeral 10, includes a throttle valve (not shown) provided for movement within an engine induction passage to control the amount of air permitted to enter the engine cylinders, and an engine speed limiting unit in the form of a flow control valve 12 provided in an air passage bypassing the throttle valve. The flow control valve 12 operates on a control signal fed thereto from an engine control unit (ECU) 14 for controlling the amount of air through the air passage to limit the engine speed below a predetermined value (for example, 2000 rpm) when the engine 10 is idling.

The drive from the engine 10 is transmitted to the driving wheels (not shown) through an automatic transmission 14 controlled by an automatic transmission control unit (ATCU) 18. The automatic transmission control unit 18 receives inputs from an an inhibitor switch 20 and an oil temperature sensor 22. The inhibitor switch 20 produces a selected position signal (SP) indicative of an selected gear position of the automatic transmission 16. The oil temperature sensor 22 preferably is mounted in the transmission working oil supply system and comprises a thermistor connected in an electrical circuit capable of producing a DC voltage (T) having a variable level proportional to working oil temperature. The selected position signal (SP) and the oil temperature signal (V) are fed through the automatic transmission control unit 18 to the engine control unit 14. The engine control unit 14 produces a command to output a control signal causing the flow control valve 12 to limit the air flow through the air passage so as to perform an engine speed limiting control when the automatic transmission 16 is in "neutral" position. The control unit 14 produces a command to interrupt the control signal to the flow control valve 12 so as to release the engine speed limiting control when the transmission is in the "park" position.

The engine control unit 14 employs a digital computer which includes a central processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from various sensors and converts them into digital form for application to the central processing unit. The read only memory contains the program for operating the central processing unit and further contains appropriate data in look-up tables used in calculating a desired value for flow control valve position. A control word specifying a desired flow control valve position is periodically transferred by the central processing unit to the input/output control unit. The input/output control unit converts the received control word into a pulse signal for application to the flow control valve 12.

Figure 2:
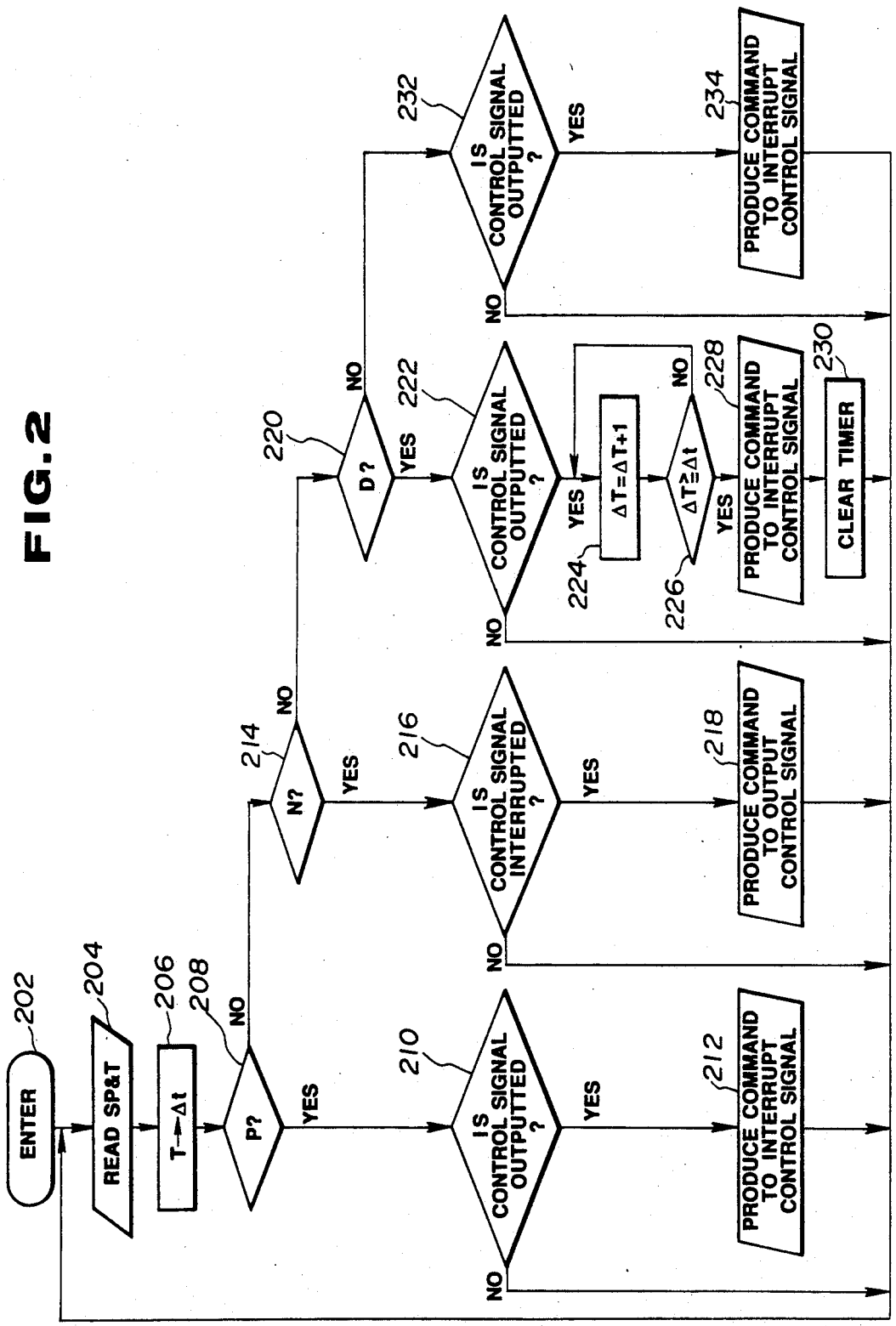
FIG. 2 is a flow diagram showing the programming of the digital computer as it is used to limit the engine speed in a specified transmission position.
Figure 3:
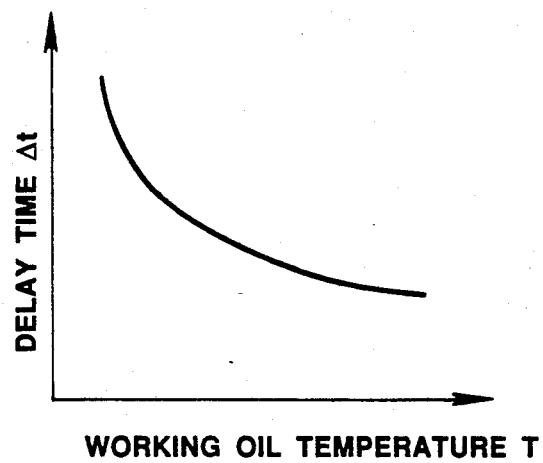
FIG. 3 is a graph of delay time versus transmission working oil temperature.

FIG. 2 is a flow diagram showing the programming of the digital computer as it is used to control the flow control valve 12. The computer program is entered at the point 202. At the point 204 in the program, the selected position signal (SP) and the working oil temperature signal (T) are read into the computer memory. At the point 206 in the program, a delay time $\Delta t$ is calculated from a relationship programmed into the computer. This relationship defines the delay time $\Delta t$ as a function of working oil temperature T, as shown in FIG. 3. The delay time $\Delta t$ decreases as the working oil temperature T increases.

At the point 208 in the program, a determination is made as to whether or not the "park" position P is selected. If the answer to this question is "yes", then the program proceeds to another determination step at the point 210. This determination is as to whether or not a control signal is produced to the flow control valve 12. If the answer to this question is "no", then the program is returned to the point 204. Otherwise, the program proceeds to the point 212 where a command is produced to interrupt the control signal to the flow control valve 12. Following this, the program proceeds to the point 204.

If the answer to the question inputted at the point 208 is "no", then the program proceeds to another determination step at the point 214. This determination is as to whether or not the "neutral" position N is selected. If the answer to this question is "yes", then the program proceeds to the point 216. At the point 216, a determination is made as to whether or not a control signal is produced to the flow control valve 12. If the answer to this question is "no", then the program is returned to the point 204. Otherwise, the program proceeds to the point 218 where a command is produced to apply a control signal to the flow control valve 12. Following this, the program is returned to the point 204.

If the answer to the question inputted at the point 214 is "no", then the program proceeds to another determination step at the point 220. This determination is as to whether or not the "drive" position D is selected. If the answer to this question is "yes", then the program proceeds to another determination step at the point 222. This determination is as to whether or not a control signal is applied to the flow control valve 12. If the answer to this question is "no", then the program is returned to the point 204. Otherwise, the program proceeds to the point 224 where the count $\Delta T$ of a timer is incremented by one step. The program then proceeds to a determination step at the point 226. This determination is as to whether or not the count $\Delta T$ of the timer is equal to or greater than the delay time $\Delta t$ calculated at the point 206. If the answer to this question is "no", then the program is returned to the point 224. Otherwise, it means that the delay time $\Delta t$ has been elapsed and the program proceeds to the point 228 where a command is produced to interrupt the control signal to the flow control valve 12. The program then proceeds to the point 230 where the count $\Delta T$ of the timer is cleared to zero. Following this, the program is returned to the point 204.

If the answer to the question inputted at the point 220 is "no", then the program proceeds to another determination step at the point 232. This determination is as to whether or not a control signal is applied to the flow control valve 12. If the answer to this question is "no", then the program is returned to the point 204. Otherwise, the program proceeds to the point 234 where a command is produced to interrupt the control signal to the flow control valve 12.

The operation is as follows:

Assuming first that the "neutral" position N is selected when the vehicle is at rest until the traffic light turns green, a control signal is applied to the flow control valve 12 so as to limit the engine speed below the predetermined value. This is effective to reduce the impact torque applied to the power train of the automatic transmission 16 when the automatic transmission 16 is changed from the "neutral" position N to the "drive" position D. This eliminates the need for reinforcement of the shafts used in the power train and reduces the size of the automatic transmission to a great extent. Since the engine speed is limited below the predetermined value when the "neutral" position is selected, it is not required to wait until the engine speed decreases. Therefore, no undesirable feel of starting lag is provided when the automatic transmission 16 changes from the "neutral" position N to the "drive" position D.

Assuming that the "park" position P is selected before the vehicle starts after a long length of time, the control signal to the flow control valve 12 is interrupted to permit the engine speed to increase above the predetermined value. This is effective to ensure engine racing required to engine worming up with the automatic transmission being held in the "park" position.

Figure 4:
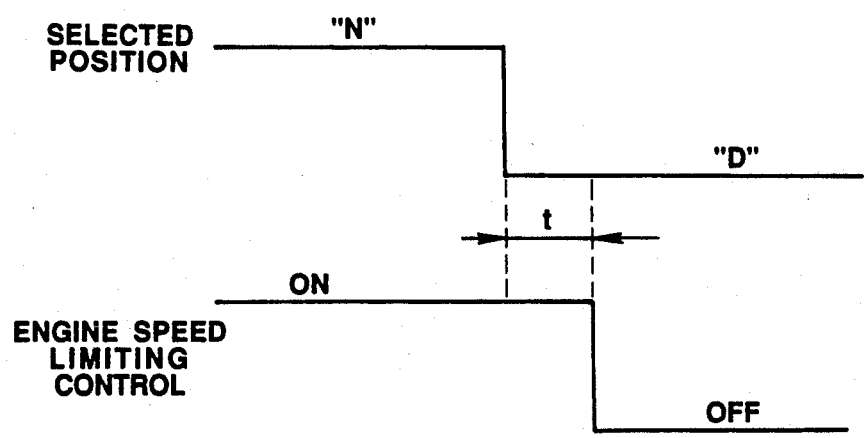
FIG. 4 is a time chart used in explaining the operation of the engine speed limiting apparatus.

Assuming that the automatic transmission 16 changes from the "neutral" position N to the "drive" position D to start the vehicle, the control signal to the flow control valve 12 is interrupted the delay time $\Delta t$ after the "drive" position D is detected, as shown in FIG. 4. This eliminates the possibility of a sudden engine speed increase which would occur just after the automatic transmission 16 changes from the "neutral" position N to the "drive" position D. This is effective to avoid a sudden vehicle starting. Since the delay time $\Delta t$ is set as a function of the working oil temperature T, it is possible to ensure a smooth vehicle starting without shock.

Although this invention has been described in conjunction with a specific embodiment thereof, it is evident that many alternatives, modification and variations will be apparent to those skilled in the art. For example, a signal from a select lever switch or a select link position sensor may be used, rather than the inhibitor switch, to detect the selected position. In addition, the flow control valve 12 may be removed and replaced with an appropriate means. For example, the engine speed may be limited below the predetermined value by limiting the amount of throttled air to the engine, controlling the ignition-system spark timing, disabling a predetermined number of engine cylinders, or interrupting the fuel delivery to the engine. Accordingly, it is intended to embrace all alternatives, modifications and variations that fall within the scope of the appended claims.

What is claimed is:

1. An apparatus for use with an automotive vehicle including an internal combustion engine operable at variable speeds and an automatic transmission operable in a selected one of positions including "park", "neutral" and "drive" positions, the apparatus comprising:
- first means for detecting the selected position of the transmission;
- second means for producing a control signal when the transmission is in the "neutral" position and for interrupting the control signal when the transmission is in the "park" position; and
- third means responsive to the control signal for limiting the speed of the engine below a predetermined value.

2. The apparatus as claimed in claim 1, wherein the second means includes means for interrupting the control signal a predetermined time after the transmission is placed into the "drive" position from the "neutral" position.

3. The apparatus as claimed in claim 1, wherein the second means includes means for interrupting the control signal a delay time after the transmission is placed into the "drive" position from the "neutral" position, means sensitive to a transmission working oil temperature for producing a signal indicative of a sensed transmission working oil temperature, and means for decreasing the delay time as the sensed transmission working oil temperature increases.

* * * * *